US009649609B2

(12) United States Patent
Alt et al.

(10) Patent No.: US 9,649,609 B2
(45) Date of Patent: May 16, 2017

(54) PROCESS FOR FLUIDIZED BED GRANULATION OF AMINO ACID-CONTAINING FERMENTATION BROTHS

(71) Applicant: EVONIK INDUSTRIES AG, Essen (DE)

(72) Inventors: Hans Christian Alt, Gelnhausen (DE); Ansgar Oelmann, Gelnhausen (DE); Andreas Höfler, Alzenau (DE); Franz Ulrich Becker, Freigericht-Horbach (DE); Wilfried Blümke, Schöneck (DE)

(73) Assignee: EVONIK DEGUSSA GMBH, Essen (DE)

( * ) Notice: Subject to any disclaimer, the term of this patent is extended or adjusted under 35 U.S.C. 154(b) by 222 days.

(21) Appl. No.: 14/678,408

(22) Filed: Apr. 3, 2015

(65) Prior Publication Data
US 2015/0283527 A1  Oct. 8, 2015

(30) Foreign Application Priority Data
Apr. 7, 2014  (EP) ..................................... 14163691

(51) Int. Cl.
*B01J 2/16* (2006.01)
*A23K 40/10* (2016.01)
(Continued)

(52) U.S. Cl.
CPC ................ *B01J 2/16* (2013.01); *A23K 10/12* (2016.05); *A23K 20/142* (2016.05); *A23K 40/10* (2016.05)

(58) Field of Classification Search
None
See application file for complete search history.

(56) References Cited

U.S. PATENT DOCUMENTS 5,840,358 A    11/1998   Hofler et al.
5,990,350 A *  11/1999   Stevens .................. C12P 13/08
                                               424/438
(Continued)

FOREIGN PATENT DOCUMENTS

CN    102274703 A    12/2011
DE       3007292 A1   9/1980
(Continued)

OTHER PUBLICATIONS

K. Rümpler, Chemische Produktion, pp. 18-21, "Granulattrocknung in Der Wirbelschicht", Jun. 1992.

*Primary Examiner* — Mary F Theisen
(74) *Attorney, Agent, or Firm* — Reed Smith LLP; Eric J. Evain; Ryan P. Cox

(57) ABSTRACT

Process for fluidized bed granulation of amino acid-containing fermentation broths comprising the steps
  Introduction of a drying gas with a temperature of 100° C.-450° C. into the fluidized bed granulation chamber
  Spraying of the amino acid-containing fermentation broth into the fluidized bed granulation chamber
  Discharge of the granules granulated in the fluidized bed granulation chamber with the drying gas stream, and drying of the discharged granules in a fluidized bed drying step,
wherein the discharged granulated granules are a granule mixture with various particle sizes and contains an oversize fraction, wherein the oversize comprises the particle sizes which lie above a desired particle size, an wherein the oversize fraction is removed from the discharged granule mixture and then comminuted and the comminuted oversize and the granule mixture from which the oversize was separated are fed into the fluidized bed drying step.

10 Claims, 3 Drawing Sheets

(51) Int. Cl.
*A23K 20/142* (2016.01)
*A23K 10/12* (2016.01)

(56) References Cited

U.S. PATENT DOCUMENTS

| | | | |
|---|---|---|---|
| 6,126,972 | A | 10/2000 | Korfer et al. |
| 7,514,111 | B2 | 4/2009 | Hong et al. |
| 2005/0025878 | A1 | 2/2005 | Alt et al. |
| 2007/0082031 | A1 | 4/2007 | Lotter et al. |
| 2007/0160740 | A1* | 7/2007 | Lee ................ A23K 1/004 426/635 |
| 2009/0087518 | A1 | 4/2009 | Moore et al. |
| 2010/0304449 | A1 | 12/2010 | Moll et al. |

FOREIGN PATENT DOCUMENTS

| | | |
|---|---|---|
| GB | 1381480 A | 1/1975 |
| GB | 2046121 A | 11/1980 |

* cited by examiner

Fig. 2 A1
Example A
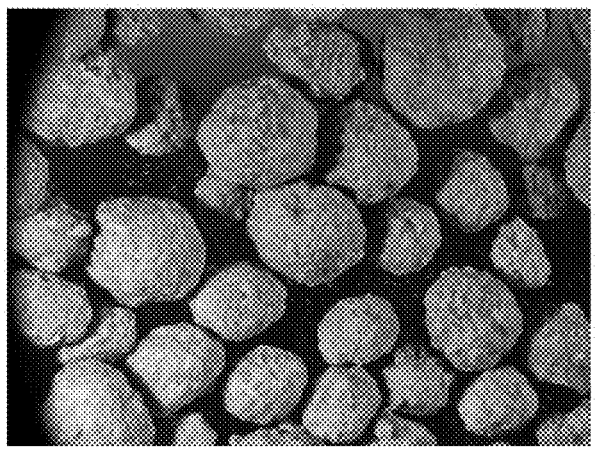
Fraction A1
(separated from the oversize)
Fig. 2 A2
Fraction A2
(oversize separated from fraction A1 and comminuted)
Fig. 2 A3
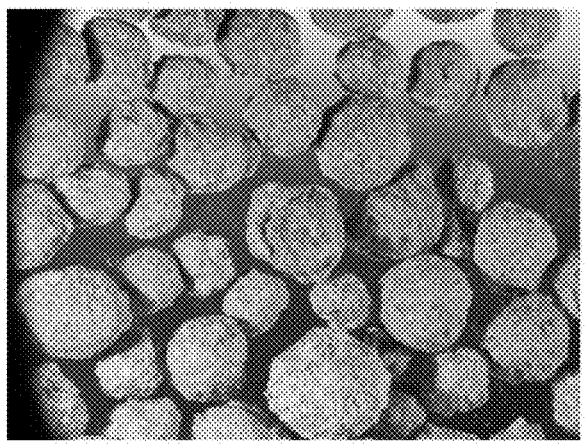
Fraction A3
(after combined treatment of the fractions A1 and A2 in a fluidized bed dryer)

Fig. 3C1
Example C1
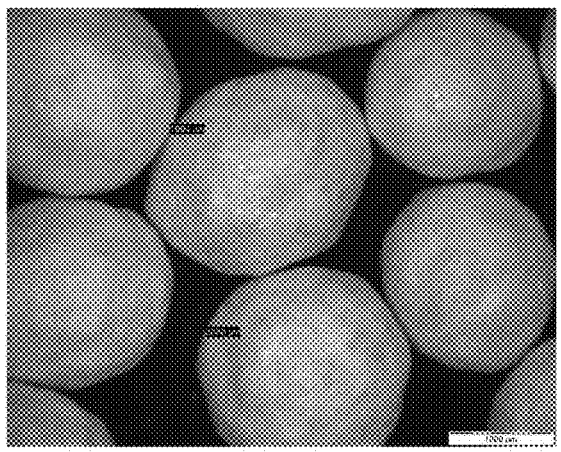
Oversize > 1000 µm
(separated from C1)
Fig. 3C2
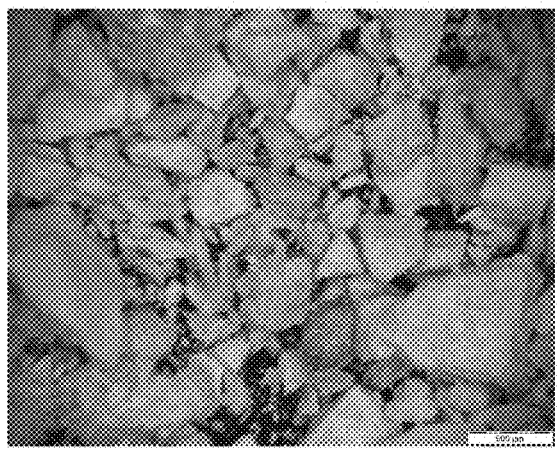
Fraction C2
(comminuted oversize)
Fig. 3C3
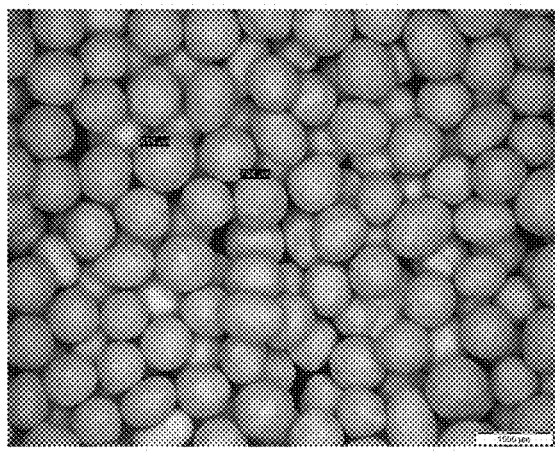
Fraction C3
(after combined treatment of the fractions C1 and C2 in a fluidized bed dryer)

PROCESS FOR FLUIDIZED BED GRANULATION OF AMINO ACID-CONTAINING FERMENTATION BROTHS

CROSS REFERENCE TO RELATED APPLICATIONS

This application claims priority to Application No. 14/163,691.0 filed in Europe on Apr. 4, 2014 under 35 U.S.C. §119. The entire contents of this application are hereby incorporated by reference.

TECHNICAL FIELD

The invention relates to a process for fluidized bed granulation of amino acid-containing fermentation broths.

BACKGROUND ART

Animal feeds are supplemented with individual amino acids in accordance with the animals' requirements. For supplementation of animal feeds, the amino acids L-lysine, L-valine, L-methionine, L-tryptophan or L-threonine are often used. In particular, for supplementation with L-lysine, L-lysine monohydrochloride with a L-lysine content of 78% was hitherto mainly used. Since L-lysine is produced by fermentation, for production of the monohydrochloride it must first of all be separated from all other components of the crude fermentation broth in laborious process steps, then converted to the monohydrochloride and the latter crystallized. During this, a large number of side products and the reagents necessary for the work-up accumulate as waste.

Since high purity of the animal feed supplement is not always necessary and moreover nutritionally active reusable substances are often contained in the side products of the fermentation, there has therefore been no lack of attempts in the past to convert L-lysine or also other fermentatively produced L-amino acids such as L-valine, L-methionine, L-tryptophan or L-threonine together with components of the fermentation broth into a solid animal feed more inexpensively.

The complex composition of such media has proved to be a disadvantage in processing. These can in general only be poorly dried, and the dried products are often hygroscopic, practically unpourable, liable to caking and unsuitable for the technically demanding processing in mixed feed plants.

The products from the fermentation for the production of lysine are in particular to be mentioned here. The combined dewatering and shaping of the crude fermentation broth by fluidized bed spray granulation drying results in easily handled granules which can be used in this form as animal feed.

Processes for granulation of amino acid-containing animal feed additives based on fermentation broth are known from the documents US 2007/0082031 A1, U.S. Pat. No. 6,126,972 A, US 2010/0304449 A1, U.S. Pat. No. 5,840,358 A and US 2005/0025878 A1.

Ever higher requirements are being set by the market on feed amino acids in the form of solids as regards their bulk material properties. Thus the products created should be dust-free and satisfactorily pourable, and have a narrow particle size distribution and as high as possible a bulk density. In addition, they should be highly stable to abrasion and have reduced hygroscopicity.

US 2005/0025878 A1 and US 2010/0304449 A1 describe the granulation of amino acid-containing and biomass-containing fermentation broths with different compositions and also downstream modified components in the stationary and the circulating fluidized bed.

Essentially, suitable granules are admittedly obtained with fluidized bed spray granulation, but the need to increase output in industrial production processes has the effect that the properties of the granules produced can again deteriorate and are no longer optimal for use. These granules are further processed, for example further dried and cooled, in process steps downstream of the fluidized bed spray granulation.

CN 102274703 A describes such a fluidized bed spray granulation process with downstream process steps for further drying and product cooling. After the fluidized bed spray granulation, the granules obtained are sieved in order to remove the oversize, which comprises the particle sizes which lie above a desired particle size. The remaining granules are further dried in a fluidized bed drying step and cooled. At the same time, in the fluidized bed drying the dust fraction is discharged with the fluidized bed gas. The sieved oversize is comminuted with a crusher and again fed into the fluidized bed spray granulation. Also, the separated dust fraction is dissolved again and sprayed into the fluidized bed granulation chamber. However, due to the reintroduction of the comminuted oversize and the dust fraction into the fluidized bed spray granulation, the throughput in the fluidized bed spray granulation is markedly increased, or in other words the high content of reintroduced particles decreases the capacity of the overall process.

DE 30 07 292 A1 (GB 2 046 121 A) discloses a fluidized bed spray granulation process without subsequent further drying step. Solutions or suspensions of solids to be recovered are sprayed on a hot gas fluidized bed and the particulate material formed in the bed is simultaneously subjected to a grinding process so that in a single step, in a single apparatus particulate material of predetermined particle size distribution is produced. However, this one step process without additional drying step is suitable for rather pure crystalline material, such as salts, metal oxides, urea or sugars. However, such a one step process is not suitable for the granulation of amino acid containing fermentation media with complex compositions which are often hygroscopic and tend to caking. As outlined above, the hygroscopic, not completely dried particulate material obtained in a fluidized bed spray granulation step often requires an additional subsequent drying step.

SUMMARY OF INVENTION

Hence the purpose of the present invention is to provide an efficient fluidized bed spray granulation process which can be operated economically, which at least diminishes the disadvantages of the state of the art and which results in high quality bulk materials with a controlled particle size distribution suitable for use.

This problem is solved by a process for fluidized bed granulation of amino acid-containing fermentation broths, comprising the steps
  introduction of a drying gas with a temperature of 100° C.-450° C. into the fluidized bed granulation chamber
  spraying of the amino acid-containing fermentation broth into the fluidized bed granulation chamber,
  discharge of the granules granulated in the fluidized bed granulation chamber with the drying gas stream, and
  drying of the discharged granules in a fluidized bed drying step,
  wherein the discharged granulated granules are a granule mixture with various particle sizes and contains an oversize fraction, wherein the oversize comprises the particle sizes which lie above a desired particle size, wherein the oversize fraction is removed from the discharged granule mixture and then comminuted and wherein the comminuted oversize and the granule mixture from which the oversize was separated are fed into a fluidized bed drying step.

BRIEF DESCRIPTION OF DRAWINGS

FIGS. 2A1-2A3 and FIGS. 3A1-3A3 are microphotographs of granule fractions according to the present invention.

BEST AND VARIOUS MODES FOR CARRYING OUT DISCLOSURE

Figure 1:
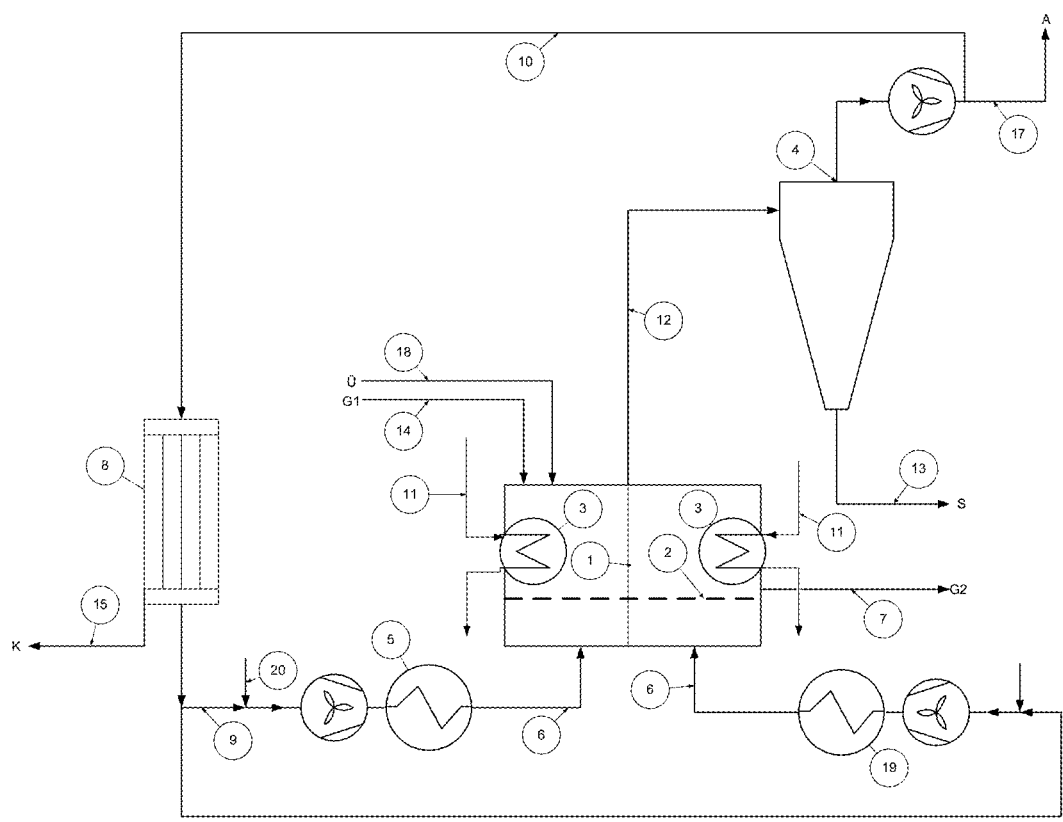
FIG. 1 is a schematic diagram of a preferred implementation of a fluidized bed drying process accordingly to the present invention.

In the sense of the present invention, the fluidized bed granulation differs from fluidized bed drying in that in the fluidized bed drying no spraying of amino acid-containing fermentation broth or resuspended granules takes place. According to the invention, the introduction of the comminuted oversize and the granule mixture from which the oversize was separated into a fluidized bed drying step cannot be understood such that this includes a recycling into the fluidized bed granulation.

Ever higher requirements are being set by the market on feed amino acids in the form of solids as regards their bulk material properties. Thus the products created should be dust-free and highly stable to abrasion and have as high as possible a bulk density.

In the state of the art, no industrial technology was previously known with which bulk material quality and throughput capacity of fluidized bed spray granulation could be simultaneously increased. According to the present invention, the comminuted oversize is not recycled into the fluidized bed granulation, but into a fluidized bed drying step downstream of the granulation. As a result, the fluidized bed granulation is less burdened with recycled particles and according to the following invention a process can for the first time be provided with which bulk material quality and throughput capacity of fluidized bed spray granulation are simultaneously increased.

A further advantage of the process according to the invention is that this can be operated continuously.

The fluidized bed granulation can be performed in a stationary or circulating fluidized bed, with the amino acid-containing fermentation broth being sprayed into a fluidized bed-containing granulation chamber in the form of an aqueous suspension or in the form of an aqueous solution.

The amino acid-containing fermentation broths used for the process according to the invention preferably contain >0% to 100% of the biomass formed during the fermentation, with the amino acid being selected from the group consisting of L-lysine, L-valine, L-methionine, L-tryptophan and L-threonine.

The process according to the invention makes it possible to operate the fluidized bed granulation with parameters which result in a high throughput capacity, but which with conventional processes would lead to a worsening of the quality properties of the granules produced.

The throughput capacity of the fluidized bed granulation can for example be increased by
 high entry temperature of the drying gases,
 low waste gas temperature,
 high inflow velocity,
 high spray volumes, high concentrations,
 high water vapour loading of the drying gases.

The following quality impairments of the granules are in particular associated with increasing the throughput capacity in the fluidized bed granulation:
 high residual moisture content,
 high stickiness,
 granule growth above the desired specification limit, i.e. increased formation of oversize,
 impairment of the morphology, surface raspberry-like,
 low bulk density,
 poor abrasion and strength values.

In the downstream fluidized bed drying, the quality of the granules is again decisively improved. The granules formed in the fluidized bed granulation are not only further dried in the downstream fluidized bed drying, but both the comminuted oversize and also the granule mixture from which the oversize was separated are intensively mixed in the fluidized bed drying and the granulated granules are thereby mechanically rounded off. In a preferred embodiment, the dust content, i.e. the content of the granule mixture with a particle size<100 μm, is discharged from the fluidized bed drying step simultaneously with the fluidized bed gas.

Operation of the granulation process with increased throughput as a rule leads to increased production of oversize. Internal or even external provision of seed particles effective for the granulation in the range<300 μm is then no longer sufficient to limit the increased growth. However, an advantage of the increased production of oversize in the fluidized bed granulation is that a coarser granule can be fed in at higher speed in the granulation process. Through the higher feed rate, the throughput in the fluidized bed granulation can be further increased.

According to the invention, the resulting oversize is separated after the fluidized bed granulation. The separation can be effected by sieving or screening, preferably by sieving.

The desired maximum particle size is dependent on the use purpose and can lie between 300 μm and 2000 μm.

In a preferred embodiment, the process according to the invention is characterized in that the oversize comprises particle sizes>900 μm. Particle sizes>900 μm are particularly undesired in the granulation of L-valine-, L-methionine- or L-threonine-containing fermentation broths. Granulated L-valine based on fermentation broth is particularly preferably characterized in that more than 80 wt. %, more than 90 wt. %, more than 95 wt. %, or more than 99 wt. % of the granulated granules have a particle size between 100 μm and 900 μm.

In a further preferred embodiment, the process according to the invention is characterized in that the oversize comprises particle sizes>1800 μm. Particle sizes>1800 μm are particularly undesired in the granulation of L-lysine-containing fermentation broths. Granulated L-lysine based on fermentation broth is particularly preferably characterized in that more than 80 wt. %, more than 90 wt. %, more than 95 wt. %, or more than 99 wt. % of the granulated granules have a particle size between 100 μm and 1800 μm.

In the case of granulated L-tryptophan, the preferred particle sizes lie in the range between 100 μm and 300 μm, and the oversize comprises therefore particle sizes>300 μm.

For the comminution of the oversize, those skilled in the art can use the usual comminution machines known in the state of the art, such as a hammer mill, impact plate mill, pinned disc mill, knife mill or roller mill.

In general, the comminution should be operated such that the dust content, i.e. the content of particle sizes<100 μm is as low as possible, since this particle size is undesired in the granulated product and hence is as a rule removed in a dust separation step. Preferably therefore, in the process according to the invention the comminution should be performed such that at least 20 wt. %, at least 30 wt. %, at least 40 wt. %, at least 50 wt. %, or at least 60 wt. % of the comminuted oversize has a particle size>100 μm.

The comminution of the oversize is preferably effected with a roller mill, since with this type of mill through adjustment of a gap between the rollers, the comminution can be particularly advantageously operated with a high content of particle sizes>100 μm.

According to the invention, the comminuted oversize and the granule mixture from which the oversize was separated are fed into a fluidized bed drying step and there intensively mixed and thereby subjected to mechanical stress.

The comminuted oversize consists of broken granules and the morphology of these broken granules differs significantly from the non-comminuted granules. The irregularly shaped fragments of the comminuted oversize must be no longer detectable in the finished product, since apart from the poorer properties with regard to abrasion, bulk density and strength, the visible poor quality is not acceptable in the end product.

The comminuted oversize and the granule mixture from which the oversize was separated are intensively subjected to mechanical stress by the particle motion in the fluidized bed drying. Loose parts on the granule surface are removed, the surfaces are intensively compacted and smoothed and the broken edges are rounded. The fine matter with a particle size<100 μm also forming during this can for example be blown directly out of the fluidized bed drying and added again to the spray solution for the granulation, i.e. be recycled into the fluidized bed granulation. Irregularly shaped fragments can then no longer be identified in the finished material.

The fluidized bed drying can be performed with a stationary or with a circulating fluidized bed.

Preferably, the fluidized bed drying is performed in at least two different zones. Due to the general division of inflow and process space into zones, different process conditions can prevail in the zones, so that for example in a first zone, the drying zone, the granule mixture is further dried and in a second zone, the cooling zone, the granule mixture is cooled.

The zones can be separated by gates and also be still further subdivided internally. The process space of the fluidized bed drying can be bounded below by a flow bottom.

The length to breadth ratio of the fluidized bed dryer is 3 to 15. The product inlet is located on one narrow side, and the outlet on the other narrow side.

The layer thickness of the fluidized bed is preferably operated in the range from 0.3 to 5 m, preferably 0.5 to 4 m and quite especially preferably 0.7 to 3 m.

As flow bottoms, perforated floors, Conidur floors, slit or sieve floors and bubble trays etc. are used. The flow bottom serves to distribute the gas flow evenly over the whole device cross-section. As a rule, the flow bottom is designed such that it causes pressure loss of ⅕ of the overall pressure loss of floor and fluidized bed under operating conditions.

Analogously to the fluidized bed zones in the process space, the region under the flow bottom is divided. By means of fans, gas heaters and coolers, the zones can be supplied with differently heated gas streams.

The gas temperatures of the drying gas in the drying zone are 80 to 350° C., particularly preferably 90 to 250° C. and quite especially preferably 100 to 150° C. The gas temperature in the cooling zone is preferably 35 to 0° C., preferably is 25 to 3° C. and particularly preferably is 15 to 5° C.

By means of the cooling zone, the temperature of the product can be reduced far enough for filling without caking to be possible. Too high a granule temperature has the result that moisture is released from the granule interiors to the surfaces and there results in caking.

Above the process space of the fluidized bed drying there is usually a waste gas hood. It is preferable that the so-called freeboard, a space above the fluidized bed not filled with fluidized bed particles, is >1.0 m.

In a particularly preferred embodiment of the process according to the invention, the fluidized bed dryer has heat exchangers as pipe bundles or plates dipping down in the process space in the particle-laden fluidized bed. The heat exchangers used in the drying zone are heated with a medium (water, steam or thermal oil). The heat exchangers used in the cooling zones are cooled with a medium (water or brine).

The heat exchanger temperatures are preferably 80 to 200° C., particularly preferably 90 to 180° C. and quite especially preferably 100 to 150° C. in the drying zones. For the cooling zones, a range from 35 to 0° C., from 25 to 3° C., or from 15 to 5° C. is preferred.

According to the invention, the product stream with comminuted oversize can have the same order of magnitude as the product stream of the granule mixture from which the oversize was separated. The comminuted oversize and the granule mixture from which the oversize was separated are preferably introduced from above into the waste air hood of the fluidized bed dryer on the product inlet side.

According to the invention, the fluidized bed in the fluidized bed drying can be operated highly expanded in all zones. The hydrodynamic parameter degree of expansion of a fluidized bed is stated as voids fraction or voidage in $m^3/m^3$ and apart from material parameters such as granule size and density is essentially dependent on the gas inflow velocity. The fluidized bed drying according to the process according to the invention is preferably operated in the voidage range from 0.4 to 0.98, 0.5 to 0.9, or 0.6 to 0.85.

The high mechanical stress caused by the operation of the fluidized bed at the stated voidages results in the breaking off of irregularities and smoothing of the surfaces, in particular with the comminuted oversize product stream. Particles which have lost their structural integrity break apart. After passage through the fluidized bed dryer, the comminuted granules can no longer be morphologically distinguished from the original granules.

Preferably, the fine material arising due to the high mechanical stress is discharged from the process, i.e. in a preferred embodiment of the process according to the invention the content of the granule mixture with a particle size<100 μm is discharged from the fluidized bed drying with the fluidized bed gas. Particularly preferably, the discharged fraction of the granule mixture with a particle size<100 μm is recycled into the fluidized bed granulation. For this, this granule mixture can be separated in downstream separators and from there recycled again into the granulation. As downstream separators, filters or cyclones can for example be used.

A further advantage of the process according to the invention is that the bulk density of the granules obtained is significantly shifted towards higher bulk densities. The bulk density of the granules discharged from fluidized bed drying is higher than the bulk density of a mixture of the comminuted oversize and the granule mixture from which the oversize was separated. According to the invention, a 5 to 15% improvement is achieved. The bulk density of the granules obtained from the process according to the invention can be 650 kg/m$^3$ to 880 kg/m$^3$.

The abrasion resistance and the fracture resistance in particular of the admixed and comminuted oversize stream are considerably reduced by the milling process. The process according to the invention results in a significant improvement in the abrasion resistance and the fracture resistance. The comminuted oversize stream can thereby be brought to the values of the granule mixture from which the oversize was separated. Further, the abrasion resistance of the granules obtained by the process according to the invention preferably has abrasion values in the range of <0.5 wt. %, particularly preferably <0.4 wt. % and quite especially preferably an abrasion between 0 and 0.3 wt. %.

For determination of the abrasion resistance, a sample is taken from the granules to be analyzed and the fraction with a particle size<500 μm sieved from this. The sample is introduced into a friability tester (ERWEKA GmbH, Heusenstamm/Germany). The granules are then treated under the following test conditions: 20 revolutions/minute and 20 minutes loading. This test is a combined abrasion and drop loading. After this treatment, the fraction with a particle size<500 μm is again determined. The fine fraction arising due to the stressing represents the abrasion. The abrasion is the measure of the abrasion resistance: the smaller the quantity of abrasion, the higher is the abrasion resistance of the granules. As already mentioned, according to the invention, the granule properties such as abrasion and fracture resistance are improved by at least 15%, 20%, or 25% compared to a treatment not according to the invention.

In a preferred embodiment, the amino acid is selected from the group L-lysine, L-methionine, L-threonine, L-tryptophan, L-valine and mixtures thereof.

In a further preferred embodiment of the process according to the invention, granules are obtained whose particle size determined by sieve analysis at least 95 wt. % lies in the range between >0.1 and 1.8 mm; more preferably, the particle size in at least 95 wt. % of the granules lies in the range between 0.3 and 1.2 mm. In a still more preferred modification, the particle size in at least 95 wt. % of the granules lies between 0.3 and 0.9 mm.

The invention targets a process for fluidized bed granulation of amino acid-containing fermentation broths in a combined fluidized bed process, which comprises a fluidized bed granulation and subsequent fluidized bed drying, wherein granules obtained from the fluidized bed granulation are firstly freed from oversize, the oversize is comminuted and then the comminuted oversize granules together with the remaining granules are intensively further treated in a fluidized bed drying step. The actual granulation process can thereby take place shifted to more oversize production under conditions which result in higher plant-based throughputs. In the downstream fluidized bed drying step, the granules are mixed with comminuted oversize granules, further dried, cooled, further milled, compacted, polished and in a preferred embodiment further sifted.

The process in particular targets the production of amino acid-containing granules which contain water-soluble amino acids such as L-lysine, L-methionine, L-valine, L-threonine and L-tryptophan.

In Chemische Produktion 6/92, pages 18-21, the operating principle of a continuous fluidized bed dryer is shown. As a rule hot air, but also hot gas, is fed into the fluidized bed granulation dryer as the drying medium, via a specially configured flow bottom. To intensify the heat transfer, in forced air operation part of the waste air can be recycled to the heat exchanger as forced air and is again available to the fluidized bed dryer as a drying medium. If fluidization is effected with cold gas (air), the same principle can also be used for product cooling.

The heat transfer for drying and cooling can be supported by heat transfer surfaces dipping down into the fluidized bed present in the process space, structured as tube bundles or as surface exchangers.

On the basis of FIG. 1, which shows a diagram of a preferred implementation of a fluidized bed drying process with a drying zone and a cooling zone, the implementation of the process according to the invention is explained in more detail.

The device comprises a fluidized bed dryer (1) divided into zones, a solid-gas separation device for dust separation (4), a device for heating the fluidized bed gas for the drying zones (5) and a device for cooling the fluidized bed gas for the cooling zones (19) and the pipes between the individual devices shown in FIG. 1. In its bottom part, the fluidized bed dryer contains a flow bottom (2), through which the fluidized bed gas (drying gas or cooling gas) introduced into the lower part of the fluidized bed dryer via a pipe (6) flows in evenly distributed form over the flow bottom in order to hold the particulate material located in the fluidized bed dryer in a stationary or in a circulating fluidized bed. Within the fluidized bed dryer, one or more tubular or flat heat exchangers (3) are arranged, through which media in liquid or vapour form are introduced via a pipe (11). The fluidized bed dryer includes a device for discharge of the granules (G2), which in the figure is made as a simple pipe (7). The fluidized bed dryer itself can be made in known manner, for example as a channel.

The fluidized bed dryer is fed with finished granules (G1) and with comminuted oversize granules (U) from the main process via the pipes 14 and 18. The mass ratio can be up to 1:1.

The actual chamber of the fluidized bed dryer in the case of a channel-like fluidized bed dryer is located in a lower part with vertical walls, and to this is connected an upper, straight or widening part as an expansion space. At the upper end of the chamber of the fluidized bed dryer, the fluidized bed gas is passed via a pipe (12) into a device for solid-gas separation (4), in which fine particles with a particle size<100 μm (dust) are separated. This device consists of known devices such as waste air filters and cyclones. If necessary, one or more separating cyclones are connected in series and optionally a waste air filter downstream. The solids separators are provided with one or more solids recycle pipes (13), through which the dust is recycled again into the main granulation process (S). For pneumatic closure of the solids separator(s)—this embodiment is necessary in particular with a fluidized bed dryer with circulating fluidized bed—normal devices such as rotary valves are used.

The fluidized bed waste gas freed of solid fractions is at least partly passed via a pipe (17) either to the outside (open operation) (A) or into a device (8) for condensation of the water vapour contained in the waste gas. In the condensation device, at least a part of the water vapour is condensed by means of a cooling medium. The condensed water vapour (K) is discharged via a pipe (15). In circulating gas operation, the residual gas from the condensation device is fed via a pipe (9) on the one hand to a device for heating the fluidized bed gases in the heating zones. On the other hand, the cooling zones are supplied with unheated gas. Both streams pass from there via a pipe (6) into chambers arranged under the flow bottom, which enable uniform inflow of the fluidized bed gas via the whole cross-section of the chamber of the fluidized bed dryer.

From the fluidized bed dryer, the granules obtained (G2) are continuously or periodically discharged from the fluidized bed chamber via a suitable discharge device—shown in the figure as a simple discharge pipe (7). The device for heating the fluidized bed gas can be of any design. For example, the gas can be heated electrically and/or with a suitable heating medium in a heat exchanger. In particular during start-up of the device according to the invention nitrogen ($N_2$) which is introduced via a pipe (20) into the device (5) for heating the fluidized bed gas can be used as the fluidized bed gas. In the start-up phase, the waste gas excess (A) is transferred out of the circulation process via a pipe (17). According to a preferred embodiment, namely gas circulation operation, part of the dedusted fluidized bed waste gas is passed via a pipe (10) and condenser (8) into a recycle pipe (9).

Further, an especially preferred embodiment is direct flue gas utilization of burned natural gas and the gas circulation operation described above. Thereby without the use of expensive inert gases the atmospheric oxygen can be reduced such that dust explosive products can be processed safely. Relatively high entry temperatures are easy to achieve. Further, this has the effect that in the gas flowing into the fluidization chamber an elevated concentration of $CO_2$ and water vapour is already present. The concentration of water vapour in the recycling circulation gas can be further deliberately influenced via the condensation temperature in the circulation gas.

The downstream treatment of solids in the stationary and circulating fluidized bed (CFB) is effected in the manner described below. Here the inflow velocity of the fluidization gas in the process chamber is preferably markedly above the discharge rate of the particles being granulated.

The particle stream conveyed through the fluidization chamber is up to 100% discharged from this chamber and can then be separated for example by means of cyclones and recycled into the chamber. This preferably takes place with a very high circulation rate. Preferred circulation rates are 2 to 100 times, particularly preferably 5 to 50 times the mass hold-up in the dryer/cooler per hour.

With the process according to the invention, optimized granules are obtained from a fermentation broth, which can be partly or wholly freed from biomass or be in the original state. Thereby in the process according to the invention, granules with a bulk density from 600 kg/m³ to 800 kg/m³, preferably 650 kg/m³ to 800 kg/m³ are obtained.

In addition, according to the process according to the invention, granules with outstanding abrasion resistance can be obtained. Thus it is easily possible to adjust the abrasion resistance of the granules to abrasion values in the range of <1.0 wt. %. Particularly preferably, the process of the invention is operated so that the abrasion resistance of the granules is adjusted to an abrasion of <0.5 wt. %, preferably <0.4 wt. % and more preferably between 0 and 0.3 wt. %.

Usually, the granules obtained with the process according to the invention contain up to 20% fermentation biomass.

EXAMPLES

Description of the Analysis

Determination of the Abrasion Resistance

For determination of the abrasion resistance, a sample of 50 g was withdrawn from the granules to be analyzed and the content of particles smaller then 500 µm are sieved out of this. The sample was introduced into an friability tester (ERWEKA GmbH, Heusenstamm/Germany). The granules were processed using the following test conditions: 20 revolutions/minute and 20 minutes loading. This is a combined abrasion and drop loading. After the processing, the content of particles<500 µm was again determined. The content of particles smaller than 500 µm arising due to the stressing represents the abrasion. The smaller the quantity of abrasion, the higher is the abrasion resistance of the granules.

Determination of the Fracture Resistance

For determination of the granule strength, the Zwick strength testing machine was used. The machine travels with the stamp with constant forward motion onto the prepositioned granule. When the granule fractures, the last applied forward motion force of the stamp is displayed. At least 20 granules were tested and the result stated as a mean value (in N).

Determination of the Particle Size Distribution

The particle size distribution was measured by dynamic image analysis with the Retsch Camsizer (RETSCH GmbH, Haan/Germany). The sample to be measured was placed in the metering device. The metering was set so that the granules pass the camera system singly. All particles of the sample were measured and stated as data set and distribution curves.

Determination of the Bulk Density

The measurement of the bulk density is based on the determination of the mass in a defined volume of powder or granulated substances. The determination of the bulk density of the granules was performed as follows: firstly the weight of an empty 250 ml cylinder was measured on the laboratory balance. The measuring cylinder was then placed under the closed opening of a funnel which possessed a somewhat greater volumetric capacity than the measuring cylinder. After this, the funnel was completely filled with the granules to be tested. Next, the funnel was opened and the measuring cylinder standing under it completely filled with granules, with a slight excess of granules being present. After this, the upper part of the granules was skimmed off the measuring cylinder with a stripper, so that a constant correct volume of 250 ml was attained. Finally, the measuring cylinder completely filled with granules was weighed on the laboratory balance and the quantity of granules contained calculated from the measured values and the bulk density of the granules stated as the mass/volume quotient in kg/m³.

Example A

L-Lysine-Containing Fermentation Broth with Side Products and Biomass—Comparison of Granule Parameters 1.0 kg of granules from the fluidized bed granulation are sieved at 1400 µm with a laboratory sieve. The material fraction<1400 µm is 0.508 kg and is directly measured (A1). The oversize>1400 µm 0.492 kg is comminuted with a roller mill with a gap of 0.2 mm and then measured (A2). Finally, both parts are again combined and exposed to intensive fluidized bed drying and then measured (A3).

The results of the analysis are presented in Table 1.

TABLE 1

|    | Bulk density [kg/m$^3$] | Abrasion resistance [%] | Fracture resistance [N] |
|----|-------------------------|-------------------------|-------------------------|
| A1 | 660                     | 0.3                     | 5.2                     |
| A2 | 612                     | 7.2                     | 2.3                     |
| A3 | 655                     | 0.3                     | 5.6                     |

As regards the bulk density, simple mixing of the fractions A1 and A2 would result in a bulk density of 636 kg/m$^3$. Through the combined treatment of the fractions A1 and A2 in a fluidized bed dryer, a bulk density of 655 kg/m$^3$ is attained (fraction A3).

As regards the abrasion resistance, with simple mixing of the fractions A1 and A2 an abrasion resistance of 3.75% would be expected. However, through the combined treatment of the fractions A1 and A2 in a fluidized bed dryer, an abrasion resistance of 0.3% is attained (fraction A3).

As regards the fracture resistance, with simple mixing of the fractions A1 and A2 a fracture resistance of 3.75 N would be expected. However, through the combined treatment of the fractions A1 and A2 in a fluidized bed dryer a fracture resistance of 5.6 N is attained (fraction A3).

FIG. 2 shows photographs of the fractions A1 and A2 (comminuted oversize separated from A1) and A3 (after combined treatment of the fractions A1 and A2 in a fluidized bed dryer).

Example B

L-Valine-Containing Fermentation Broth with Side Products and Biomass

Comparison of Granule Parameters 1 kg of granules direct from the granulation are sieved at 1000 μm by means of a laboratory sieve. 2 fractions of approximately equal size are obtained. The through fraction is measured directly (B1), and the oversize is comminuted with a roller mill with a gap of 0.2 mm and then measured (B2). Finally, both parts are again combined and exposed to intensive fluidized bed after-treatment and then measured (B3).

The results of the analysis are shown in Table 2.

TABLE 2

|    | Bulk density [kg/m$^3$] | Abrasion [%] | Fracture resistance [N] |
|----|-------------------------|--------------|-------------------------|
| B1 | 578                     | 5.3          | 4.7                     |
| B2 | 505                     | 10.2         | 1.8                     |
| B3 | 579                     | 5.2          | 4.8                     |

As regards the bulk density, simple mixing of the fractions B1 and B2 would result in a bulk density of 541.5 kg/m$^3$. Through the combined treatment of the fractions B1 and B2 in a fluidized bed dryer, a bulk density of 579 kg/m$^3$ is attained (fraction B3).

As regards the abrasion resistance, with simple mixing of the fractions B1 and B2 an abrasion resistance of 7.75% would be expected. However, through the combined treatment of the fractions B1 and B2 in a fluidized bed dryer, an abrasion resistance of 5.2% is attained (fraction B3).

As regards the fracture resistance, with simple mixing of the fractions B1 and B2 a fracture resistance of 3.25 N would be expected. However, through the combined treatment of the fractions B1 and B2 in a fluidized bed dryer a fracture resistance of 4.8 N is attained (fraction B3).

Example C

L-Methionine-Containing Fermentation Broth with Side Products and Biomass

Comparison of Granule Parameters 1 kg of granules direct from the granulation are sieved at 710 μm by means of a laboratory sieve. 2 fractions of approximately equal size are obtained. The through fraction is measured directly (C1), and the oversize is comminuted with a roller mill with a gap of 0.2 mm and then measured (C2). Finally, both parts are again combined and exposed to an intensive fluidized bed after-treatment and then measured (C3).

The results of the analysis are shown in Table 3.

TABLE 3

|    | Bulk density [kg/m$^3$] | Abrasion [%] | Fracture resistance [N] |
|----|-------------------------|--------------|-------------------------|
| C1 | 555                     | 4.5          | 4.4                     |
| C2 | 502                     | 13.8         | 1.3                     |
| C3 | 565                     | 4.6          | 4.3                     |

As regards the bulk density, simple mixing of the fractions C1 and C2 would result in a bulk density of 528.5 kg/m$^3$. Through the combined treatment of the fractions C1 and C2 in a fluidized bed dryer, a bulk density of 565 kg/m$^3$ is attained (fraction C3).

As regards the abrasion resistance, with simple mixing of the fractions C1 and C2 an abrasion resistance of 9.15% would be expected. However, through the combined treatment of the fractions C1 and C2 in a fluidized bed dryer, an abrasion resistance of 4.6% is attained (fraction C3).

As regards the fracture resistance, with simple mixing of the fractions C1 and C2 a fracture resistance of 2.85 N would be expected. However, through the combined treatment of the fractions C1 and C2 in a fluidized bed dryer a fracture resistance of 4.3 N is attained (fraction C3).

FIG. 3 shows photographs of the oversize separated from C1, the fraction C2 (comminuted oversize) and the fraction C3 (after combined treatment of the fractions C1 and C2 in a fluidized bed dryer).

The invention claimed is:

1. Process for fluidized bed granulation of amino acid-containing fermentation broths comprising the steps
   Introduction of a drying gas with a temperature of 100° C.-450° C. into the fluidized bed granulation chamber
   Spraying of the amino acid-containing fermentation broth into the fluidized bed granulation chamber
   Discharge of the granules granulated in the fluidized bed granulation chamber with the drying gas stream, and
   drying of the discharged granules in a fluidized bed drying step,
   wherein the discharged granulated granules are a granule mixture with various particle sizes and contains an oversize fraction and wherein the oversize comprises the particle sizes which lie above a desired particle size, wherein the oversize fraction is removed from the discharged granule mixture and then comminuted and wherein the comminuted oversize and the granule mixture from which the oversize was separated, are fed into the fluidized bed drying step.

2. Process according to claim 1, wherein the fluidized bed drying has at least one drying zone and at least one cooling zone and wherein the drying gas stream in the drying zone has a temperature of 80 to 350° C. and the cooling gas stream in the cooling zone has a temperature of 35 to 0° C.

3. Process according to claim 1, wherein the amino acid-containing fermentation broths contain >0% to 100% of the biomass formed during the fermentation and that the amino acid is selected from the group consisting of L-lysine, L-valine, L-methionine, L-tryptophan and L-threonine.

4. Process according to claim 1, wherein the separation of the oversize is effected by sieving.

5. Process according to claim 1, wherein the oversize comprises particle sizes>900 μm.

6. Process according to claim 1, wherein the oversize comprises particle sizes>1800 μm.

7. Process according to claim 1, wherein the comminution of the oversize is effected with a roller mill.

8. Process according to claim 1, wherein at least 20 wt. % of the comminuted oversize has a particle size>100 μm.

9. Process according to claim 1, wherein the content of the granule mixture with a particle size<100 μm is discharged from the fluidized bed drying with the fluidized bed gas.

10. Process according to claim 1, wherein the content of the granule mixture with a particle size<100 μm is recycled into the fluidized bed granulation.

* * * * *